Oct. 3, 1950  F. E. EYSTER  2,524,656
APPARATUS FOR EMPTYING BREAD PANS
Filed July 28, 1945  2 Sheets-Sheet 1
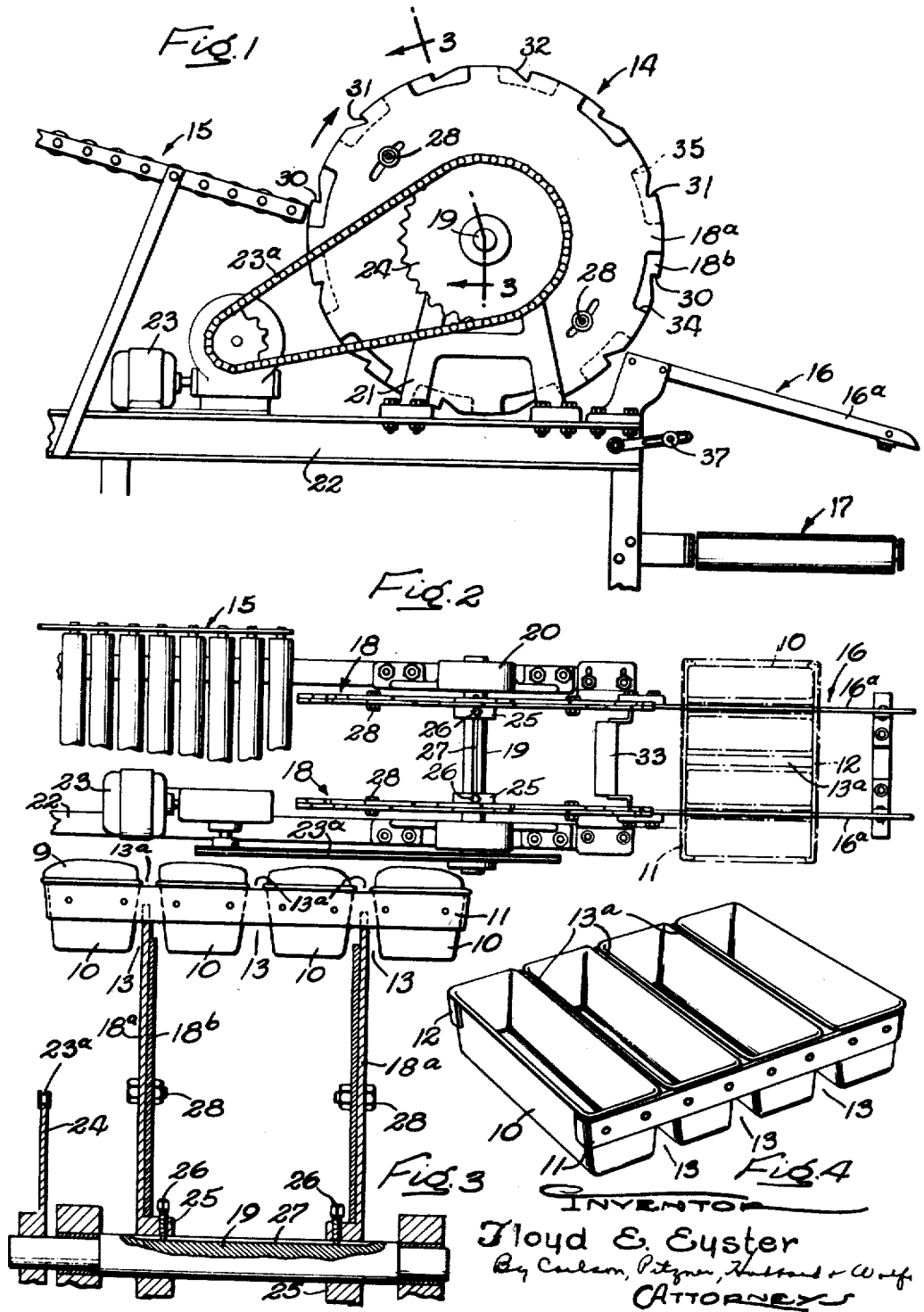

Oct. 3, 1950        F. E. EYSTER        2,524,656
APPARATUS FOR EMPTYING BREAD PANS
Filed July 28, 1945        2 Sheets-Sheet 2
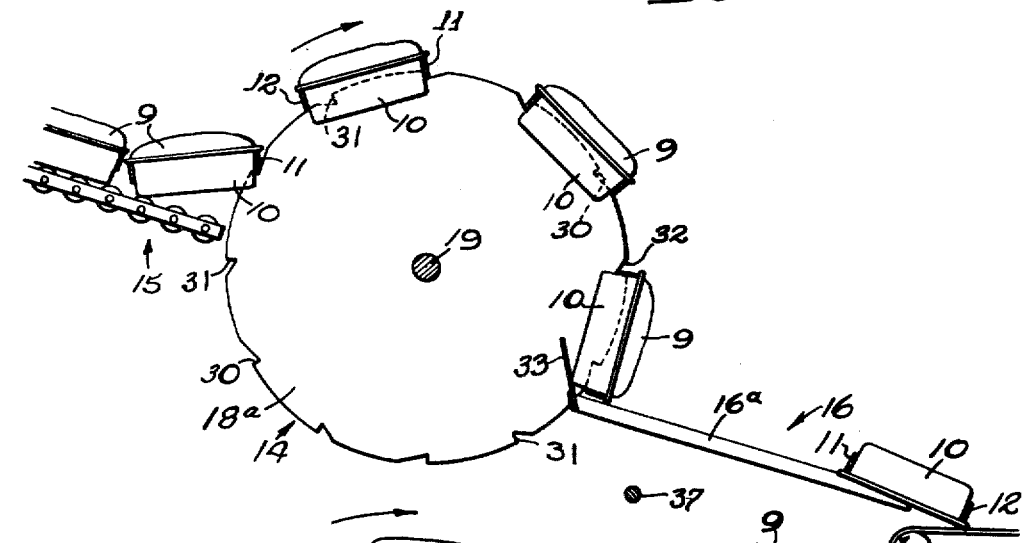
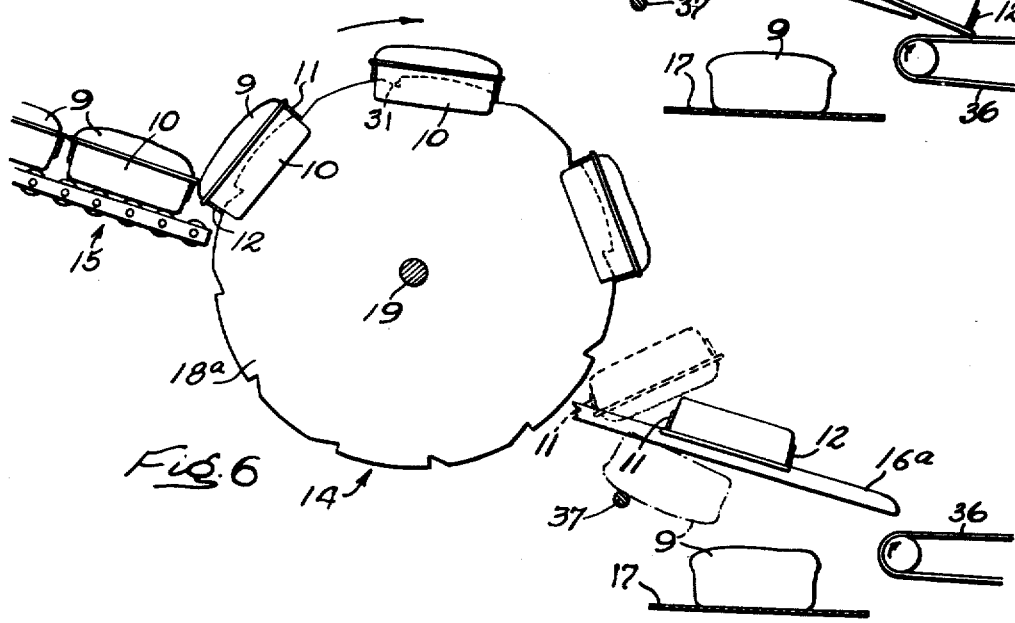
INVENTOR
Floyd E. Eyster Patented Oct. 3, 1950

2,524,656

UNITED STATES PATENT OFFICE 2,524,656

APPARATUS FOR EMPTYING BREAD PANS

Floyd E. Eyster, Rockford, Ill., assignor, by mesne assignments, of one-half to The Peterson Oven Company, Chicago, Ill., a corporation of Illinois Application July 28, 1945, Serial No. 607,585

20 Claims. (Cl. 214—1.1)

This invention relates to the unloading of bread pans, particularly those used in bakeries.

The primary object is to provide a novel means for automatically emptying bread pans by inverting them onto a support through which the loaves will fall and then become separated from the pans, which are retained on the support.

Another object is to remove bread loaves from an ordinary multiple pan unit in which they are baked by partially tilting the unit to cause the same to swing downwardly against knock-out bars which are engageable with the top portion of the unit between the adjacent bread loaves therein to arrest the motion of the unit abruptly and cause the loaves to be discharged downwardly through the bars.

A further object is to effect the desired tilting of the loaded pan unit while the latter is traversing the downwardly extending side of an arcuate path along which the unit is carried by a continuously moving carrier.

Another object is to provide a novel means for engaging the loaves after their release from the pan unit and turning the loaves about a transverse axis to re-invert them as they are deposited on a conveyor.

A more detailed object is to invert the loaded pans by raising and lowering the same over the top of a movable carrier.

Another object is to provide a novel means for engaging the pans to attach them to the carrier and release the pans therefrom in inverted position.

The invention also resides in the novel manner of delivering successive loaded pans to the carrier and in discharging the pans in proper position, and in the novel arrangement of the knock-out bars for engagement of the latter with the crossbars by which the pans of the unit are connected.

Other objects and advantages of the invention will become apparent from the following detailed description taken in connection with the accompanying drawings, in which Figure 1 is a side elevational view of the improved unloading mechanism and the associated conveyors.

Fig. 2 is a plan view.

Fig. 3 is a fragmentary sectional view taken along the line 3—3 of Fig. 1.

Fig. 4 is a perspective view of a set of bread pans.

Figs. 5 and 6 are diagrammatic views illustrating the operation of the unloading apparatus.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The present invention is especially adapted for unloading or emptying bread loaves 9 from pans 10, a plurality of which are arranged side by side (Fig. 4) and rigidly connected by crossbars 11 and 12 extending across opposite ends and secured thereto as by rivets. The ends of the pans of such a unit or set taper slightly toward their bottoms so that the flat bars 11 and 12 similarly converge downwardly. Owing to the downward taper of the sides of the pans, the adjacent pans are spaced apart adjacent the lower edges of the crossbars, thereby leaving grooves 13 between the adjacent pans. The crossbars also hold the upper marginal edges of adjacent pans separated by spaces 13$^a$.

The improved unloading apparatus comprises generally a travelling carrier 14 movable upwardly to pick up the loaded bread pans off from a conveyor 15 and then downwardly to tilt the supported pans over and discharge them in inverted position onto a second chute 6, which is constructed to retain the pans while allowing the bread loaves, jarred loose by impact with the chute, to fall back onto a third conveyor 17.

Preferably the conveyor 14 comprises two rigid wheels 18 axially spaced apart along a shaft 19 journalled at opposite ends in bearings 20 to turn about a horizontal axis. The bearings are supported in brackets 21 mounted on a suitable framework 22 by which the conveyors 15, 16 and 17 may also be supported as shown. An electric motor 23 operates through suitable speed reduction mechanism including a chain 23$^a$ to drive a sprocket 24 and the carrier in a direction to move one side of the carrier periphery upwardly past the chute 15 and the opposite side downwardly past the chute 16.

In the present instance, each of the wheels 18 comprises two rigid disks 18$^a$ and 18$^b$, the former having a hub 25 fastened to the shaft 19 by set screws 26 entered in a longitudinal slot on the shaft so as to permit of relative axial adjustment of the two pairs of disks. Normally, the disks are clamped together by bolts 28 extending through a slot in one disk so as to permit of relative angular adjustment of the disks. The axial spacing of the disks is such that they will enter the grooves 13 between the outer and inner pans 10, as shown in Fig. 3. At annularly spaced points around the peripheries of the inner disks 18ᵇ, means is provided for engaging the leading crossbar 11 of a pan resting on the chute 15 and carrying such pan upwardly and over the top of the conveyor. This means is formed by notching the disks 18ᵇ so as to define lugs having shoulders 30 which extend generally radially of the disks and face circumferentially in the direction of motion of the carrier. The shoulders are angularly spaced apart so that the successive pans supported on the disks will be separated a substantial distance for timing purposes.

When the forward crossbar 11 of a pan on the chute 15 is picked up by one of the shoulders 30, the ends of the pans are elevated as shown in Fig. 5, and the rear ends slide downwardly along the chute until, as shown in Fig. 6, the rear crossbar 12 comes to rest against the peripheries of the disks 18ᵃ. The pans are thus held by gravity in a definite position on the carrier as the pan moves over the top of the latter. As the pans thus held move over center and start downwardly, they slide by gravity forwardly and ahead of the shoulders 30. This motion is limited by similar, oppositely facing shoulders 31, which are on lugs formed by notching the disks 18ᵃ and which are spaced behind the shoulders 30 a distance somewhat less than the spacing of the crossbars 11 and 12 on the bread pans being handled. As the pans thus slide free of the shoulders 30, the forward crossbar 11 rests against the peripheries of the disks 18ᵇ until it passes below the axis of the carrier. Then the pans hang suspended from the shoulders 31 and, owing to the inclination of the crossbar 12 relative to the vertical axis of the pan and to the location of the center of gravity of the pan and the loaf thereof relative to the point of suspension, the lower ends of the pans become inclined rearwardly and downwardly as they approach the chute 16 (see Fig. 5). When the pans thus partially tilted strike the chute 16, they tilt over into inverted position onto the chute 16. The inverting action may be assisted by the inclined surfaces 32 on the disk notches behind the shoulders 31 and by a cam plate 33, stationarily mounted on the frame 22 in position to engage the leading ends of the pans as they approach the chute 16.

The shoulders 30 and 31 above described are formed on the two disks 18ᵃ and 18ᵇ so that their spacing may be varied and the carrier thus adapted to handle bread pans of different lengths. Such an adjustment is permitted by the bolt and slot connections between the two disks, as above described, and by the formation of elongated segmental recesses 34 in the peripheries of the disks 18ᵃ opposite the shoulders 30 on the disks 18ᵇ. Similar recesses 35 are formed in the disks 18ᵇ opposite the shoulders 31 on the disks 18ᵃ. The circumferential lengths of these recesses determine the range of permissible angular adjustment between the disks.

The chute 15 is constructed so as to urge the row of pans thereon continuously toward the carrier 14, thereby holding the crossbar 11 of the leading pans against the peripheries of the disks so that it will enter the next notches presented thereto and be picked up by the shoulders 30. Such feeding of the pans forwardly may be effected by employing a conveyor of the roller type and by inclining it downwardly at the proper angle. The chute is located at such a height relative to the carrier 14 that the crossbar 11 of the leading pans engages the disks 18 above the level of the carrier axis.

In the present instance, the chute 16 comprises two rails 16ᵃ supported by the frame 22 in parallel relation and spaced the same distance apart as the disks 18 for engagement between the adjacent loaves and more particularly to pass through the spaces 13ᵃ between the adjacent pan margins and engage the crossbars 11 and 12 and thereby arrest the downward swinging of the pan units abruptly. In view of this spacing, the inner two loaves in each group of pans drop down between the rails when the inverted pan unit is discharged thereon while the outer loaves fall outside of the rails. Such unloading of the pans is produced effectively because the impact produced when the pans strike the rails loosens the loaves, which then fall through the chute as the pans become fully inverted. The loaves are received side by side on the horizontal conveyor 17 which may be a belt travelling transversely of the chute 16.

A crossbar 37, adjustably mounted on the frame 22, is disposed below the rail 16 in a position to intercept the falling bread loaves near the end thereof adjacent the carrier 14. The other or longer ends of the loaves continue downwardly under their momentum so that a motion is imparted to the loaves to turn them over by the time they reach the conveyor 17, on which they are received in upright position. The spacing of the pan units on the carrier 14, the speed of the latter, and the speed of the conveyor 17 are so correlated that an empty portion of the latter conveyor will always be disposed below the chute 16 at the time the next group of loaves is discharged downwardly.

The rails 16ᵃ are inclined downwardly and away from the carrier 14 at an angle sufficient to cause the emptied pans to slide out of the way of the oncoming pans. The pans may be discharged fom the chute 16 onto a moving conveyor 36.

Referring to Figs. 5 and 6 which illustrate the progress of successive pan units through the apparatus above described, the units with loaves of bread in pans thereof are delivered down the conveyor 15 with the bottom grooves 13 and the spaces 13ᵃ between the adjacent pans 10 approximately alined with the disks 18ᵃ by which the leading unit is picked up by its crossbar 11 and carried upwardly and over the top of an arcuate path. Actual tipping of the unit while thus supported on the carrier takes place on the downwardly moving side of the latter. When the unit approaches the knock-out bar 16ᵃ, the pans will have been tilted somewhat past a vertical plane so as to become subjected to the action of gravity under which the units tend to fall away from the carrier and swing outwardly about the lower margin of the unit to complete the inversion of the latter. This action is accelerated by engagement of the unit with the stop 33 which insures release of the pan unit from the turnover mechanism always at a predetermined position.

At this time, the edge of the crossbar 11 adjacent the top of the pan unit encounters the knock-out bars 16ᵃ on which the released pan unit fulcrums as shown in dotted outline in Fig. 6 as the other margin of the unit and the crossbar 12 continue to swing outwardly and downwardly. This gravitational movement continues as the knock-out bars enter the spaces 13ᵃ between the adjacent pans which become fully inverted when the crossbar 12 engages the knock-out bars 16ª. Swinging of the pan unit is thus arrested abruptly and the resulting jolt loosens the bread loaves and dislodges them from the pans from which the loaves fall downwardly past the knock-out bars. The pan unit is retained upside down with its crossbars 11 and 12 resting on the knock-out bars 16ª as shown at the right in Fig. 6 and later slide down the bar inclines onto the conveyor 36. Reinversion of the inverted falling loaves is effected by the abutment 37 which engages the loaves at a point offset from the longitudinal center so that the momentum of the longer end portions will continue the turning of the loaves about a transverse axis and effect complete reinversion of the loaves by the time they reach the conveyor element 17.

The apparatus above described is exceedingly simple and efficient in its operation, and may readily be associated with a baking oven from which the pans may be discharged directly out of the conveyor 15. A fully automatic means is thus employed for emptying the pans and keeping them separated from the loaves.

I claim as my invention:

1. In an apparatus for unloading bread pans having crossbars projecting laterally from opposite ends thereof, the combination of a shaft mounted to turn unidirectionally about a horizontal axis, two disks rigid with and spaced along said shaft to receive a bread pan between them, a conveyor for supporting a succession of pans and delivering the same toward the upwardly moving side of the disk peripheries with said crossbars extending across the disks about said shaft, shoulders annularly spaced around said disks and circumferentially facing in the direction of rotation thereof for engagement with the leading crossbar of the leading pan on said conveyor whereby to raise the pan with the trailing crossbar thereof resting on the disk peripheries, second shoulders on said disks circumferentially spaced in advance of the trailing crossbar of a pan carried by the disks and engageable with the latter crossbar as the pan slides forwardly away from the first shoulders in passing over the top of the disks, and downwardly inclined rails disposed below said shaft on the downwardly moving side of the disks and laterally spaced to engage said crossbars but to permit the downward discharge of the bread loaves from the inverted pans delivered onto the rails from said disks.

2. In an apparatus for unloading bread pans having crossbars projecting laterally from opposite ends thereof, the combination of, two spaced supports, one for supporting a row of loaded bread pans in upright position and the other being adapted to support a row of pans from their crossbars while in inverted position, a movable carrier disposed between said supports and having one side adjacent said first support movable upwardly and a side adjacent the other support movable downwardly, the intervening portion of the carrier travelling in an arcuate path, a shoulder on said carrier facing in the direction of travel of the carrier and engageable with the leading crossbar of a pan on said first support to pull the pan forwardly while raising the same through said arcuate path, and a second reversely facing shoulder on said carrier engageable with the trailing crossbar on the pan as the latter slides downwardly ahead of said first shoulder after passing over the top of the carrier.

3. In an apparatus for unloading bread pans having laterally spaced crossbars projecting laterally from opposite ends thereof, the combination of a shaft mounted to turn unidirectionally about a horizontal axis, a carrier mounted to turn about a horizontal axis and having two rigid wheels axially spaced apart to engage the ends of said crossbars but to receive a pan between them, means for turning said carrier unidirectionally, annularly spaced shoulders on said wheels facing circumferentially in the direction of turning of said carrier and engageable with one crossbar of a pan, and second shoulders on said wheels spaced behind the latter a shorter distance than the spacing of said crossbars and facing circumferentially in the opposite direction for engagement with the other crossbar of the pan.

4. In an apparatus for unloading bread pans having crossbars projecting laterally from opposite ends thereof, the combination of a shaft mounted to turn unidirectionally about a horizontal axis, a carrier mounted to turn about a horizontal axis and having two rigid wheels axially spaced apart to engage the ends of said crossbars but to receive a pan between them, means for turning said carrier unidirectionally, annularly spaced shoulders on said wheels facing circumferentially in the direction of turning of said carrier and engageable with one crossbar of a pan, the other crossbar resting on said wheels as the pan passes over the top of the carrier, and second shoulders on said wheels spaced behind the latter and facing circumferentially in the opposite direction for engagement with the other crossbar of the pan as the latter slides forwardly in reaching the downwardly moving side of the carrier.

5. In an apparatus for unloading bread pans having crossbars projecting laterally from opposite ends thereof, the combination of a shaft mounted to turn unidirectionally about a horizontal axis, a carrier mounted to turn about a horizontal axis and having two rigid wheels axially spaced apart to engage the ends of said crossbars but to receive a pan between them, means for turning said carrier unidirectionally, annularly spaced shoulders on said wheels facing circumferentially in the direction of turning of said carrier and engageable with one crossbar of a pan, second shoulders on said wheels spaced behind the latter a shorter distance than the spacing of said crossbars and facing circumferentially in the opposite direction for engagement with the other crossbar of the pan, means for delivering pans in upright position against the upwardly moving side of said wheels, and means on the opposite side of the carrier disposed below the axis thereof and engageable with each pan after the latter has tilted over center in moving downwardly with said wheels.

6. In an apparatus for unloading bread pans, the combination of a carrier mounted to turn about a horizontal axis and having a rigid periphery, means for turning said carrier unidirectionally, supporting means for delivering pans one by one against the upwardly moving side of said periphery, a circumferentially facing surface on said periphery engageable with a part of the leading pan at a point above the axis of said carrier to elevate the pan over the top of the carrier, a second surface on said periphery engaging the pan to hold the same against gravitation off from the carrier as the pan moves downwardly, a support disposed below the axis of said carrier on the downwardly moving side thereof, and means for camming the pan off from the carrier and tilting the same into inverted position on said support.

7. In an apparatus for unloading bread pans, the combination of a carrier mounted to turn about a horizontal axis and having a rigid periphery, means for turning said carrier unidirectionally, supporting means for delivering pans one by one against the upwardly moving side of said periphery, a radially disposed surface on said periphery engageable with a part of the leading pan to elevate the latter over the top of said carrier, a second surface on the carrier for engaging and holding the pan on the latter as it moves downwardly, a support disposed below the axis of said carrier on the downwardly moving side thereof, and means for camming the pan off from the carrier and tilting the same into inverted position on said support.

8. In an apparatus for unloading groups of laterally spaced bread pans rigidly connected by end crossbars, the combination of, a shaft, a pair of disks fast on and axially spaced along said shaft and having circumferentially facing peripheral shoulders engageable with one crossbar of a pan group, and a second pair of disks disposed adjacent the respective first disks and having oppositely facing shoulders adapted for engagement with the other crossbar of the pan groups, and means connecting said first and second disks rigidly together but releasable to permit of relative angular adjustment therebetween, said first disk having circumferentially elongated peripheral recesses opposite said second shoulders and the second disks having similar recesses opposite the first shoulders whereby to leave both sets of shoulders exposed in the different portions of angular adjustment of said disks.

9. In an apparatus for unloading bread loaves from a unit comprising a plurality of rigidly connected pans disposed side by side, the combination of, a carrier movable in a path which extends upwardly and then downwardly, surfaces on said carrier engageable with a horizontally supported loaded pan unit and operable to elevate the unit and then tilt the same as it passes over the top of said path, rigidly supported bars on the downwardly moving side of said carrier and laterally spaced to allow bread loaves discharged from said unit to fall therethrough while supporting the unit, stop means engageable with the tilted pan unit as the latter approaches said bars in passing downwardly and operable to tip the unit over onto said bars, a conveyor disposed below said bars, and means engageable with said bread loaves discharged between said bars and operable to invert the loaves and deliver the same right side up onto said conveyor.

10. In a depanning device for removing loaves of bread or the like from open-topped pans in which they are baked, the combination of conveyor means for conveying a pan of bread to a depanning station, said conveyor means including a downwardly curved section adjacent to the depanning station for at least partially inverting the pan, a lug movable with the conveyor means about the periphery of said curved section for supporting the pan during at least a part of said inverting movement, means adapted to receive and engage a top portion of the pan during the inverting movement to arrest the pan and jar the bread from the pan, said arresting means permitting the bread to fall by gravity and momentum from the pan, an element adapted to receive the bread as it falls from the pan, and bread re-inverting means interposed between the arresting means and said element and adapted to intercept the bread as it falls from the pan, turn it about an axis transverse to the conveyor means, and drop it on said element in righted position.

11. In a depanning device for extracting bread or the like from a plurality of open-topped pans forming a unitary pan set in which the bread is baked, the combination of conveyor means for conveying the pan sets to a depanning station, said conveyor means including a downwardly curved section adjacent to the depanning station for at least partially inverting the pans, a lug movable with the conveyor means about the periphery of said curved section for supporting a pan set during at least a part of said inverting movement, a knock-out bar adapted to receive and engage a top section of the pan set between adjacent loaves of bread during the inverting movement to arrest the pan set and jar the bread from the pans, said bar permitting the bread to fall by gravity and momentum from the pans, an element adapted to receive the bread as it falls from the pans, and bread pre-inverting means interposed between the knock-out bar and said element and adapted to intercept the bread as it falls from the pans, turn the bread about an axis transverse to the conveyor means, and drop the bread on said element in righted position.

12. In a depanning device for extracting bread or the like from a plurality of open-topped pans forming a unitary pan set in which the bread is baked, the combination of conveyor means for conveying the pan sets to a depanning station and for at least partially inverting the pans, said conveyor means including a carrier movable in an arcuate path, an abutment on the carrier for supporting a pan set during at least a part of said inverting movement, a knock-out bar adapted to receive and engage a top portion of the pan set between adjacent loaves of bread, said bar jarring the bread from the pans and permitting the bread to fall by gravity and momentum from the pans, an element adapted to receive the bread as it falls from the pans, and bread re-inverting means interposed between the knock-out bar and said element and adapted to intercept the bread as it falls from the pans, turn the bread about an axis transverse to the conveyor means, and drop the bread on said element in righted position.

13. In an apparatus for unloading bread loaves from a pan unit comprising a plurality of open top pans disposed side by side and rigidly connected at their tops, the combination of, a carrier for supporting a filled pan unit and carrying the same along a path which extends upwardly and then downwardly along a curved path, said carrier having surfaces thereon engageable with the pan unit when in upright position and operable to tilt the unit past a vertical plane and thereby cause the unit to swing outwardly and away from said carrier and fall clear of the latter in its continued movement, bars laterally spaced apart for engagement with portions of the pan unit adjacent the pan openings therein and between adjacent loaves and disposed in the path of the swinging pan unit to interrupt the motion thereof abruptly and thereby jolt the unit so as to loosen the loaves therein and cause the same to be discharged through said bars and downwardly beyond the latter leaving the pan unit supported by the bars, a bread-receiving element disposed below said bars, and means including an abutment engageable with said bread loaves discharged through said bars and operable to reinvert the loaves and deliver the same right side up onto said bread-receiving element.

14. In an apparatus for unloading bread loaves from a unit comprising a plurality of pans disposed side by side and rigidly connected at their tops, the combination of, means for supporting a bread pan unit in a predetermined upright position, a power driven carrier continuously movable upwardly past said position and thereafter downwardly along an arcuate path about a generally horizontal axis, said carrier having spaced surfaces thereon engageable with a downwardly facing surface of said unit in said position and operable to retain control of the unit after the latter has passed over the top of said path and is traversing a downwardly extending part of the path and then tilt the unit past a vertical plane and thereby cause the upper edge portion of the unit to swing outwardly and fall free from said carrier along a path outwardly beyond the carrier, and bars laterally spaced apart for engagement with the portions of the pan unit between adjacent loaves therein and disposed beyond said vertical plane in a position to intercept the unit and interrupt said outward swinging abruptly whereby to jolt the unit so as to loosen the loaves therein and cause the same to be discharged through said bars and downwardly beyond the latter leaving the pan unit supported by the bars.

15. In an apparatus for unloading bread loaves from a unit comprising a plurality of rigidly connected pans disposed side by side, the combination of, means for supporting a bread pan unit in a predetermined upright position, a carrier continuously movable upwardly past said position and thereafter downwardly along an arcuate path about a horizontal axis, abutment surfaces on said carrier engageable with an underside surface of said unit in said position to support the unit and operable after the unit has been carried over the top of said path and is traversing a downwardly extending part of said path to tilt the unit past a vertical plane and cause the upper edge portion of the unit to swing outwardly and fall away from said carrier surfaces, and a stop engageable with the lowermost portion of the pan unit when the latter is in a substantially vertical position during the inverting movement and operable to accelerate the outward swinging of the unit away from the carrier.

16. In an apparatus for unloading bread loaves from a unit comprising a plurality of open topped pans disposed side by side and rigidly connected at their tops, the combination of, a carrier for supporting a bread pan unit and movable to tilt the same in a curved path from an upright position through a portion of a revolution to dispose the unit past a vertical plane and thereby initiate continued free tilting of at least a part of the unit away from engagement with the carrier, and bars laterally spaced apart for engagement with portions of the top of the released pan unit between adjacent loaves therein and positioned to interrupt the freely tilting pan unit abruptly at a point beyond said vertical plane whereby to cause the loaves to be discharged through said bars and downwardly beyond the latter leaving the pan unit supported by the bars.

17. In an apparatus for unloading bread loaves from a unit comprising a plurality of rigidly connected open topped pans disposed side by side in spaced relation and rigidly connected near their top margins, the combination of, mechanism for receiving one of said units and supporting the same for movement in a curved path to tilt the unit about one margin and in a plane parallel to the longitudinal edges of the pans, power driven means operable to actuate said mechanism and tilt the supported unit through said path and tip the unit over beyond a vertical plane until the unit is subject to the action of gravity for causing continued tilting of the unit, and narrow bars disposed in the path of the tilting pan unit and laterally spaced apart intermediate the ends of the unit for engagement with portions of the unit between adjacent bread loaves therein whereby to arrest the tilting motion of the unit abruptly and cause the loaves to be dislodged therefrom and discharged downwardly beyond the bars.

18. In an apparatus for unloading bread loaves from a unit comprising a plurality of open top pans disposed side by side in spaced apart relation and rigidly connected together by cross-members spanning the spaces between the adjacent pans at points spaced longitudinally of the adjacent pan margins and holding the latter spaced apart, the combination of, a carrier for receiving and supporting one of said units, means for supporting said carrier for movement along a curved path to tilt the supported unit in a plane paralleling the longitudinal edges of the pans and tip the unit over past the vertical, power driven means operable to move said carrier through said path until the supported unit is tilted past the vertical and becomes subject to the action of gravity for causing continued tilting of the unit, and knock-out bars narrower than the spaces between the adjacent pans of said units and disposed in the path of the gravitationally tilting pan unit, said knock-out bars being laterally spaced apart to enter said spaces and engage said cross-members whereby to arrest the motion of said unit abruptly and cause the bread loaves therein to be dislodged from the pans and discharged downwardly.

19. In an apparatus for unloading bread loaves from a unit comprising a plurality of open top pans disposed side by side and rigidly connected together by cross-members separating the adjacent margins of the pans at the tops thereof to define spaces between the adjacent pans, the combination of, a carrier movable in a curved path which extends upwardly past the vertical and then downwardly, surfaces on said carrier engageable with an upright loaded pan unit and operable as the carrier traverses said path to tilt the pan unit in a vertical plane paralleling said spaces and tip the unit over beyond a vertical position whereby to cause continued tilting of the unit by the action of gravity, and knock-out bars laterally spaced apart and positioned in the path of the gravitationally tilting unit for engagement simultaneously with top portions of the pan unit to interrupt the tilting motion abruptly and cause the loaves to be dislodged from the unit and discharged downwardly beyond the knock-out bars, at least one of said knock-out bars being positioned in the plane of one of said spaces of the tilting unit so as to enter this space and engage said cross-member between two adjacent pans of the unit.

20. In an apparatus for unloading bread loaves from a unit comprising a plurality of open topped pans disposed side by side in spaced apart relation and rigidly connected together by cross members spanning the spaces between adjacent pans and holding the latter spaced apart, the combination of a carrier for receiving and supporting one of said pan units, means supporting said carrier for movement along a curved path in a plane paralleling the longitudinal edges of the pans, power driven means operable to move said carrier through said path, said carrier having supporting surfaces thereon engageable with the pan unit to effect at least partial inversion thereof and tilting of the unit off from the carrier at a predetermined point in the path of travel of the supporting surfaces, and knock-out bars narrower than the spaces between the adjacent pans of said units and disposed in the path of movement of the pan unit after release thereof from said carrier, said knock-out bars being laterally spaced apart to enter said spaces and engage said cross members, whereby to abruptly arrest the motion of said unit and cause the bread loaves therein to be dislodged from the pans and discharged past the bars in a downward direction.

FLOYD E. EYSTER.

REFERENCES CITED

The following references are of record in the file of this patent:

UNITED STATES PATENTS

| Number | Name | Date |
| --- | --- | --- |
| 1,049,523 | Parker | Jan. 7, 1913 |
| 1,210,096 | Parker | Dec. 26, 1916 |
| 1,366,874 | Christians | Jan. 25, 1921 |
| 1,432,747 | Eggert | Oct. 24, 1922 |
| 1,452,711 | Schroeder et al. | Apr. 24, 1923 |
| 1,462,468 | Schaller | July 17, 1923 |
| 1,473,996 | McGarry | Nov. 3, 1923 |
| 1,561,664 | Rathwell | Nov. 17, 1925 |
| 1,868,058 | Furness | July 19, 1932 |
| 1,935,891 | Schroeder | Nov. 21, 1933 |
| 2,081,944 | Lund | June 1, 1937 |
| 2,098,526 | Stegemann | Nov. 9, 1937 |